United States Patent
Guigné et al.

(10) Patent No.: US 8,757,701 B2
(45) Date of Patent: Jun. 24, 2014

(54) DRAG REDUCTION DEVICE FOR TRANSPORT VEHICLES HAVING RANDOMIZED IRREGULAR SHAPED EDGE VORTEX GENERATING CHANNELS

(75) Inventors: Jacques Y. Guigné, Paradise (CA); Ron Davidson, Carp (CA)

(73) Assignee: Aeroserve Technologies, Ltd., Carp, Ontario (CA)

( * ) Notice: Subject to any disclaimer, the term of this patent is extended or adjusted under 35 U.S.C. 154(b) by 289 days.

(21) Appl. No.: 13/004,952

(22) Filed: Jan. 12, 2011

(65) Prior Publication Data

US 2011/0175395 A1    Jul. 21, 2011

Related U.S. Application Data

(60) Provisional application No. 61/295,239, filed on Jan. 15, 2010.

(51) Int. Cl.
B60J 9/00 (2006.01)

(52) U.S. Cl.
USPC ........................................ 296/180.3

(58) Field of Classification Search
USPC ............ 296/180.3, 180.2, 180.5, 180.1; 244/130, 198, 199.1, 199.2, 199.4, 36, 244/46, 200.1, 204, 207, 209
See application file for complete search history.

(56) References Cited

U.S. PATENT DOCUMENTS

| | | | | |
|---|---|---|---|---|
| 2,800,291 A * | 7/1957 | Stephens | 244/200 |
| 4,256,304 A * | 3/1981 | Smith et al. | 473/451 |
| 4,284,302 A * | 8/1981 | Drews | 296/181.5 |
| 4,354,648 A * | 10/1982 | Schenk et al. | 244/200.1 |
| 4,455,045 A * | 6/1984 | Wheeler | 296/181.5 |
| 4,776,535 A * | 10/1988 | Paterson et al. | 244/130 |
| 4,789,117 A * | 12/1988 | Paterson et al. | 244/130 |
| 4,802,642 A * | 2/1989 | Mangiarotty | 244/200 |
| 4,813,633 A * | 3/1989 | Werle et al. | 244/130 |
| 4,813,635 A * | 3/1989 | Paterson et al. | 244/130 |
| 4,830,315 A * | 5/1989 | Presz et al. | 244/200 |
| 4,867,397 A * | 9/1989 | Pamadi et al. | 296/180.1 |
| 4,905,622 A * | 3/1990 | Silvia, Jr. | 114/122 |
| 4,986,496 A * | 1/1991 | Marentic et al. | 244/130 |
| 5,058,837 A * | 10/1991 | Wheeler | 244/200.1 |
| 5,069,403 A * | 12/1991 | Marentic et al. | 244/130 |
| 5,133,516 A * | 7/1992 | Marentic et al. | 244/130 |
| 5,209,166 A * | 5/1993 | Tylisz et al. | 105/1.1 |
| 5,255,881 A * | 10/1993 | Rao | 244/199.1 |
| 5,280,990 A * | 1/1994 | Rinard | 296/180.1 |
| 5,653,493 A * | 8/1997 | Spears | 296/180.2 |
| 5,734,990 A * | 4/1998 | Waring | 2/69 |
| 6,105,904 A * | 8/2000 | Lisy et al. | 244/200.1 |
| 6,837,465 B2 * | 1/2005 | Lisy et al. | 244/204.1 |
| 6,926,345 B2 * | 8/2005 | Ortega et al. | 296/180.4 |
| 6,959,958 B2 * | 11/2005 | Basford | 296/180.1 |
| 7,070,850 B2 * | 7/2006 | Dietz et al. | 428/172 |
| 7,100,969 B2 * | 9/2006 | Choi et al. | 296/180.1 |
| 7,192,077 B1 * | 3/2007 | Hilleman | 296/180.1 |
| 7,255,387 B2 * | 8/2007 | Wood | 296/180.1 |
| 7,334,760 B1 * | 2/2008 | Lisy et al. | 244/203 |

(Continued)

Primary Examiner — Kiran B Patel

(74) Attorney, Agent, or Firm — Richard A. Fagin

(57) ABSTRACT

A drag reducing device for use on transport vehicles includes a delta wing having variable height and irregularly spaced undulations on an upper surface of each side of the wing. A length of each side of the delta wing is different than the length of the other wing side thereof.

3 Claims, 5 Drawing Sheets

(56) References Cited

U.S. PATENT DOCUMENTS

| | | | |
|---|---|---|---|
| 7,604,461 B2* | 10/2009 | Bonnet | 416/235 |
| 7,644,977 B2* | 1/2010 | Drews | 296/181.5 |
| 7,810,867 B2* | 10/2010 | Salaverry | 296/180.1 |
| 7,954,768 B1* | 6/2011 | Patel et al. | 244/205 |
| 8,141,936 B2* | 3/2012 | Salaverry | 296/180.1 |
| 8,267,355 B1* | 9/2012 | Patel et al. | 244/205 |
| 2004/0084569 A1* | 5/2004 | Bonutti | 244/204 |
| 2005/0107189 A1* | 5/2005 | Ohama et al. | 473/371 |
| 2007/0284848 A1* | 12/2007 | Brownlie | 280/288.1 |
| 2010/0276006 A1* | 11/2010 | Bonutti | 137/13 |
| 2011/0008174 A1* | 1/2011 | Ireland | 416/223 R |
| 2011/0095565 A1* | 4/2011 | Chen | 296/180.4 |
| 2011/0115254 A1* | 5/2011 | Skopic | 296/180.3 |
| 2011/0164960 A1* | 7/2011 | Maldonado | 415/115 |
| 2011/0241377 A1* | 10/2011 | Rogers et al. | 296/180.3 |
| 2011/0284113 A1* | 11/2011 | Bonutti | 137/803 |

* cited by examiner

← Direction of Travel
RANDOM IRREGULAR SHAPED VORTEX GENERATORS

← Direction of Travel
RANDOM IRREGULAR SHAPED VORTEX GENERATORS

DRAG REDUCTION DEVICE FOR TRANSPORT VEHICLES HAVING RANDOMIZED IRREGULAR SHAPED EDGE VORTEX GENERATING CHANNELS

CROSS-REFERENCE TO RELATED APPLICATIONS

Priority is claimed from U.S. Provisional Application No. 61/295,239 filed on Jan. 15, 2010.

STATEMENT REGARDING FEDERALLY SPONSORED RESEARCH OR DEVELOPMENT

Not applicable.

BACKGROUND OF THE INVENTION

1. Field of the Invention

The invention relates generally to the field of drag reducing devices used with transport vehicles. More particularly the invention relates to specialized shapes for such devices that have greater efficiency in drag reduction.

2. Background Art

It is well understood in the art of physics of fluid flow control over surfaces that an adverse pressure gradient exists when low static and high static pressure regions interact. As a fluid boundary layer flows across a flow control surface there tends to be a blocking boundary formed which can block the flow and even reverse the motion of fluid flow locally. This may in turn separate the fluid with a resulting rise in drag. It is again well understood in the art that generating stream-wise vortices, generally using so-called vortex generators, can create conditions of mixing which may prevent a separation of the flow. There are many types of vortex generators primarily embodied as devices with vanes that protrude above the boundary layer, such as described by Stephens in U.S. Pat. No. 2,800,291. Limitations of the device described in the '291 patent include that the boundary is regulated with increased conditions of drag. Other approaches have been discussed in Kluethe, U.S. Pat. Nos. 3,578,264 and 3,741,285 primarily exhibiting internal boundary vortices when a fluid encounters and is made to flow over a concave surface; in effect forcing the boundary layer between adjacent wings to transfer a vortex into the boundary layer and cause mixing. The results of such devices while of academic merit have inefficiencies due to out of scale issues leading to excess drag.

Wheeler, in U.S. Pat. No. 4,455,045 describes in detail that a strong vortex is formed along the leading edges of delta wings at high angles of attack. In the disclosed device in the '045 patent, submerged channels are molded to have a nominally triangular plan form shape permanently formed onto a flow surface. The channels as described in the '045 patent have sharp upper edges for effective vortex formation, divergent sidewalls essentially normal to the flow-control surface, and floor contours arranged to immediately conduct the stream-wise vortices below the level of the local flow control surface. Basically, the principles described in the '045 patent are that placing a series of submerged channels to be nested together in a properly overlapping manner creates a stream-wise cascade, thereby reducing the drag and at the same time controlling the boundary flow.

There exists a need for improved drag reducing devices for use on long transport vehicles.

SUMMARY OF THE INVENTION

A drag reducing device for use on transport vehicles according to one aspect of the invention includes a delta wing having variable height and irregularly spaced undulations on an upper surface of each side of the wing. A length of each side of the delta wing is different than the length of the other wing side thereof.

Other aspects and advantages of the invention will be apparent from the following description and the appended claims.

DETAILED DESCRIPTION

Figure 5:
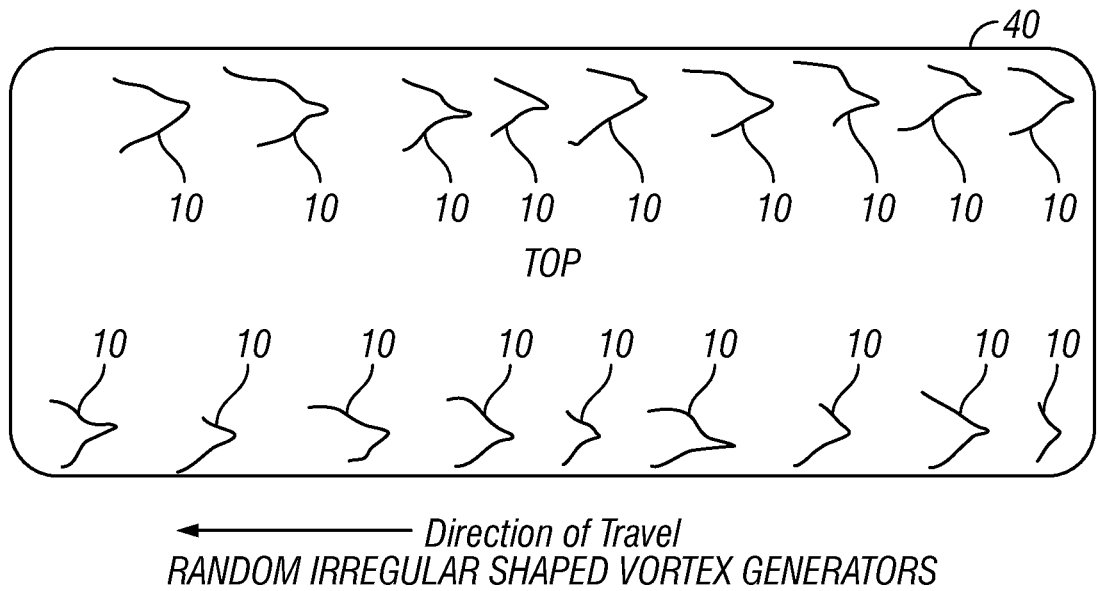
FIGS. 5 and 6 show, respectively, line arrays of drag reducing devices according to the invention disposed on the top and side(s) of a railroad car.
Figure 6:
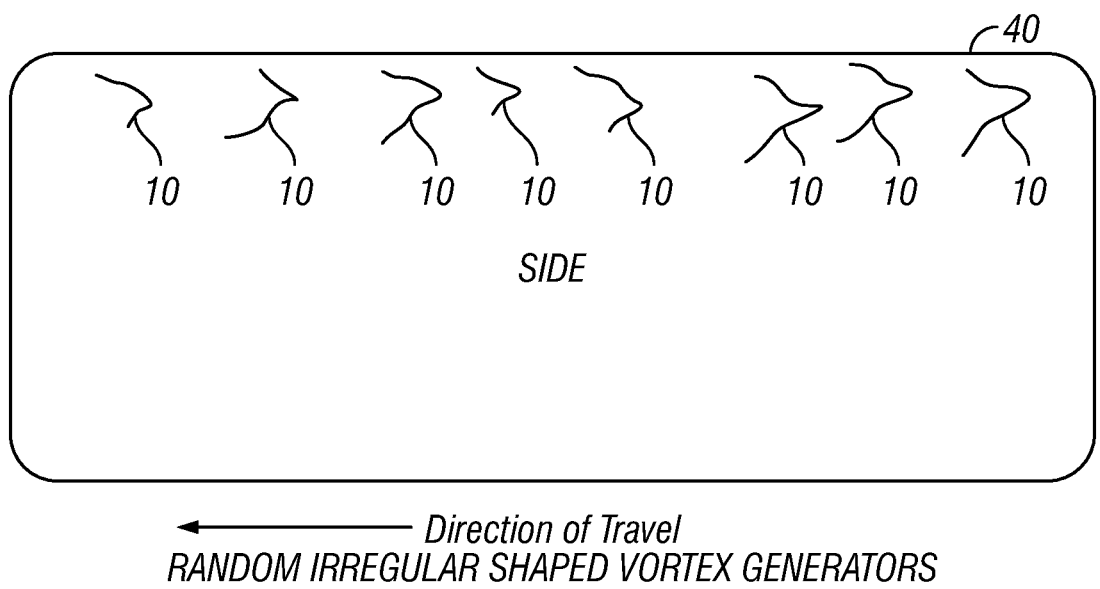

The present invention augments the effectiveness of vortex generator drag reducing devices known in the art by including a plurality of random sized, but critically varying vortices to be steadily generated downstream of the device. This function is performed by substituting the sharp, smooth, linear leading edges on delta wings or submerged channel wall edges as described in the Wheeler '045 patent referred to in the Background section herein with randomly undulating leading structural edge members having irregularly spaced, multi-wavelength in depth, cascading forms on the forward edge of a delta wing. The overall lengths of the leading edges may be different from each other, and in practice are elongated by several meters to allow for continuous stream-wise varying sized vortices to effectively be maintained even when in adverse changing pressure gradients such as observed under windy conditions. Using the delta wing edge design of the invention, drag is reduced under varying conditions of pressure such as observed when wind gusts occur across long, streamlined transport trucks and trains. With vortex generator drag reducing devices known in the art prior to the present invention, the resulting flow of air as moved by these prior art add on devices cannot fill the massive wake behind a moving linear vehicle body. This typically results in very minor benefits in terms of the energy saved when using such drag reduction vortex generating devices. In the present invention the randomized, undulating morphology of the delta wings and their individual uneven length, enable an order of magnitude increase in the linear lengths of the sides of the delta wings for certain applications. That is, a drag reduction device according to the invention may be made in sizes having wing lengths as large as the meter scale, whereas prior art drag reduction devices using the delta wing shape are generally limited to centimetre scale sizes. The increase in possible useful size of a drag reduction device according to the invention can substantially boost the movement of air flow, with more effective infilling of the wake with continuous regeneration of vortices as previously formed eddies dissipate. A drag reduction device according to the invention may provide effective drag reduction on larger transport vehicles than is possible using prior art configurations. As an example of a typical embodiment of the invention in larger sizes, drag reducing devices may be placed as a linear array of delta wings along the sides of a train roof and/or along the sides of a railroad car (FIGS. 5 and 6). As another example of an embodiment, smaller versions of the delta wings according to the invention may be used on the air deflector wing and/or on the sides of a tractor in a tractor trailer truck combination.

The present invention provides a structure for a drag reducing device which augments the reduction of energy as would be required by such slender vehicles as trains and long transport trucks as they move air by providing a novel means of effectively redistributing flow in the areas of adverse pressure gradients as caused by air flow and windy conditions. The present invention results in measurable reduction of energy requirements which directly translate into reduced fuel consumption for very linear long and large moving platforms. In addition, as a result of placing the invention on the roofs of transport truck trailers, an increased level of control would be noted when travelling in high winds, greatly reducing the events of tipping.

Figure 1A:
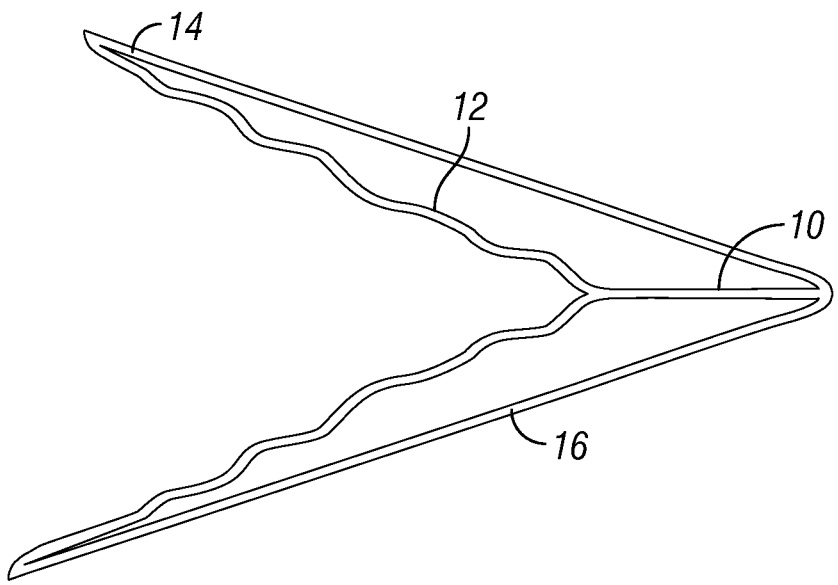
FIG. 1A shows an example implementation of a drag reducing device according to the invention.

Referring to FIG. 1A, a first example of a drag reducing device according to the invention is shown in plan view. The drag reducing device 10 is generally shaped as an open delta "wishbone" having a first side 14 and a second side 16 converge with respect to a center of the drag reducing device 10. A surface of the drag reducing device 10 may have a relatively high angle of attack with respect to the direction of motion of the vehicle to which the device 10 is placed on the roof thereof. An example angle of attack may be up to about sixty degrees. The leading edge of each side 14, 16 includes randomly variable height, depth and spacing undulations 12. The length of each side 14, 16 may be different than the length of the other side 16, 14 of the drag reducing device 10.

Figure 1B:
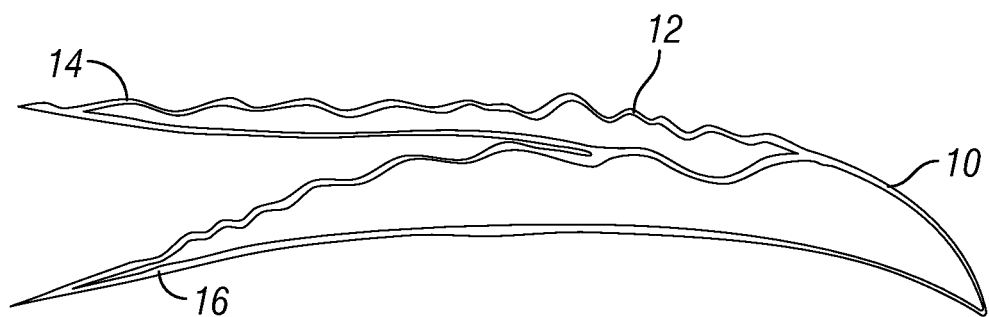
FIG. 1B shows another implementation of a drag reducing device according to the invention.

Another example of a drag reducing device according to the invention is shown in FIG. 1B. The example in FIG. 1B may include all the same features as the example shown in FIG. 1A, only with different values of the parameters described with reference to FIG. 1A. A possible result of making a drag reducing device as explained above is that the device 10 may generate random size and spacing, counter rotating vortices in the space behind the device 10.

Figure 2:
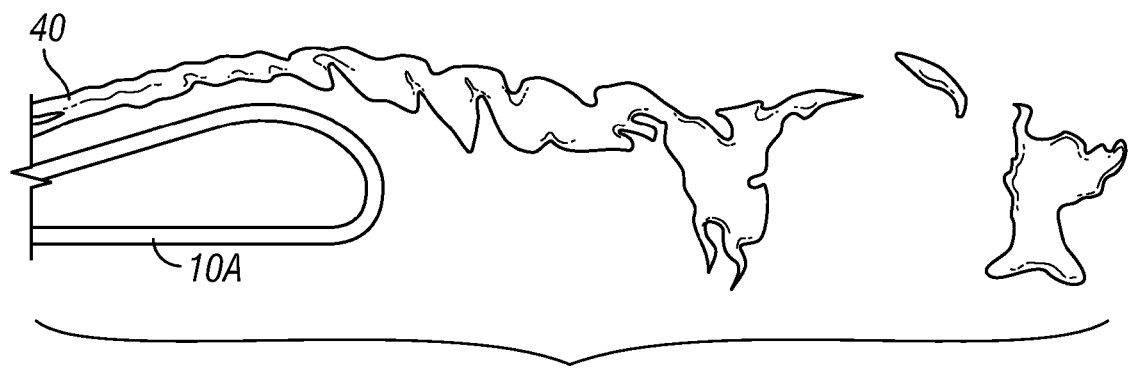
FIG. 2 shows simulated air flow over a prior art drag reduction device having a smooth surface.

FIG. 2 shows a simulation of air flow across the surface of a prior art delta wing drag reduction device 10A. The air flow 40 can be observed generating a single, large vortex in the air flow behind the drag reduction device 40. Such vortex can result in decreased drag reduction, that is, increased drag.

Figure 3:
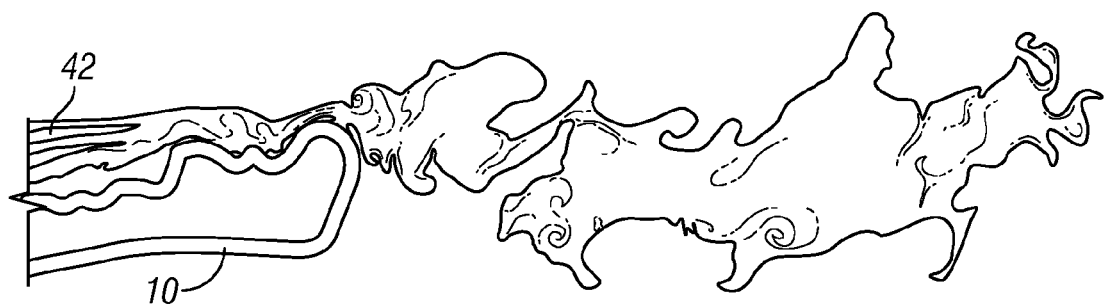
FIG. 3 shows simulated air flow over an example drag reduction device according to the invention.

FIG. 3 shows a simulation of air flow across the surface of a delta wing drag reduction device according to the present invention. Air flow 42 over the drag reduction device 10 can be observed as distinctly lacking the single, large vortex in the air flow behind the drag reduction device 10, rather, smaller, spaced apart counter rotating vortices are generated, further reducing resistance to air flow as contrasted with the device shown in FIG. 2. The foregoing simulations included capturing at the resultant fluid motion through simulated smoke lines over typical smooth edge (FIG. 2) and randomized undulating edges (FIG. 3) computed by solving the Navier-Stokes equations at high definition.

Figure 2A:
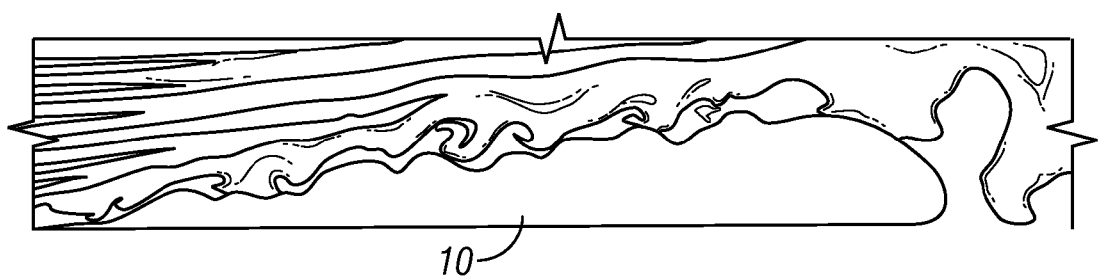
FIG. 2A shows simulated air flow over an example drag reduction device according to the invention to show micro eddies formed by the irregular surface.
Figure 3A:
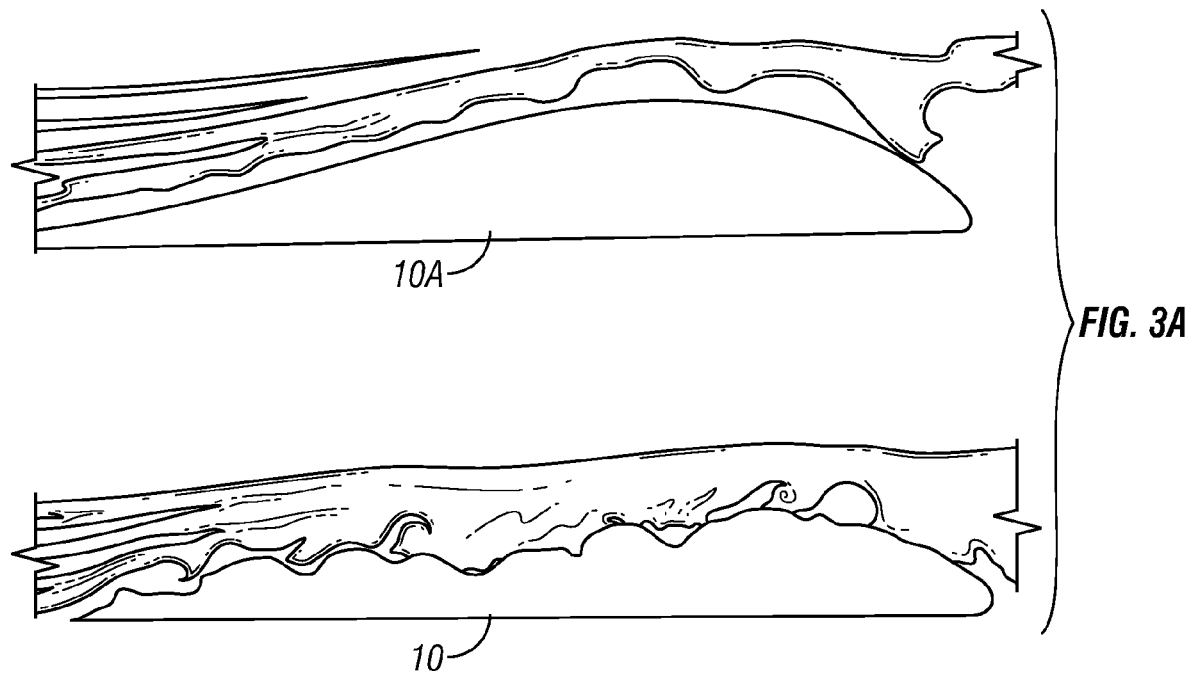
FIG. 3A shows a direct comparison of air flow over a smooth surface drag reduction device and a drag reduction device according to the invention.

FIG. 2A shows a simulation of air flow over the surface of a drag reduction device 10 according to the invention. Micro eddies in the air flow can be observed above the upper surface of the drag reduction device 10. A direct comparison of the air flow over a prior art drag reduction device 10A and a drag reduction device according to the invention is shown in FIG. 3A. It can be observed in the figure that the air flow over the prior art drag reduction device 10A lacks the micro eddies of the air flow over the drag reduction device 10 of the invention.

Figure 4:
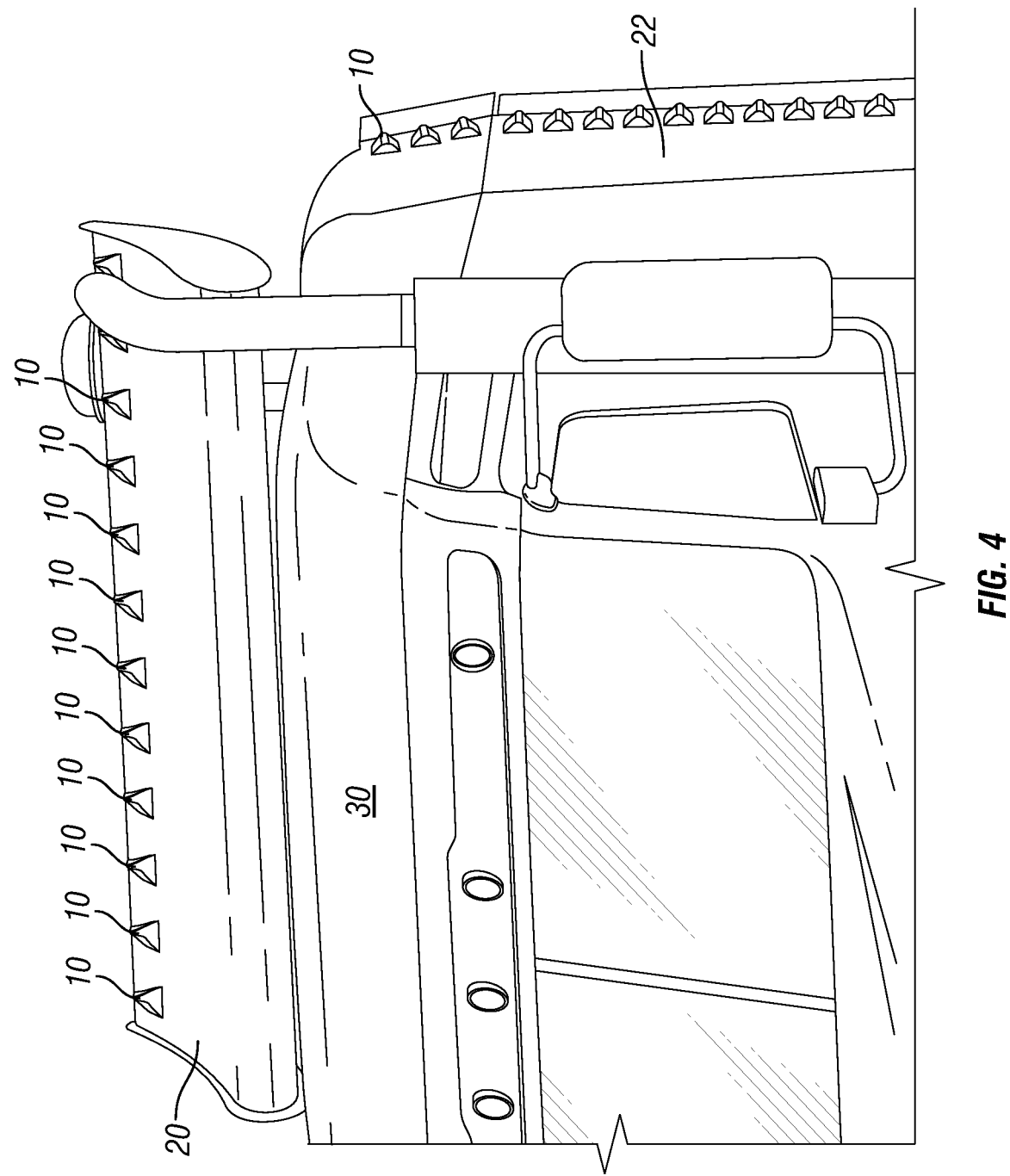
FIG. 4 shows an example installation of drag reducing devices according to the invention on a tractor of a tractor trailer combination truck.

FIG. 4 shows an example installation of drag reducing devices 10 on an air deflector wing 20 and the side 22 of a tractor 30 of a tractor trailer combination truck. Similar mounting may be used in other types of transport vehicles.

FIGS. 5 and 6 show, respectively, line arrays as described above, of drag reduction devices 10 according to the invention disposed on the top (FIG. 5) and one side (FIG. 6) of a railroad car 40. The railroad car 40 can be any or all cars in a train including the locomotive(s). The side view in FIG. 6 is applicable to both sides of any railroad car 40. Direction of motion of the railroad car 40 is indicated by the arrow at the bottom of FIG. 6.

A drag reduction device according to the invention may reduce air flow caused drag on transport vehicles, resulting in improved efficiency of operation and reduced fuel consumption.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A drag reducing device for use on transport vehicles, comprising:
    a first raised side and a second raised side, the sides converging at one end thereof, a leading edge of each side with respect to a direction of motion of the drag reducing device having variable height and irregularly spaced undulations on an upper surface thereof; and
    wherein a length of the first side is different than a length of the second side thereof.

2. The drag reducing device of claim 1 wherein a plurality of the drag reducing devices is mounted on an air deflector wing of a tractor in a tractor trailer combination truck.

3. The drag reducing device of claim 1 wherein a plurality of the drag reducing devices is mounted in a linear array.

* * * * *